Dec. 23, 1958  R. L. CRANE  2,865,412
DRIVE WHEEL FOR BAND SAWS
Original Filed Sept. 12, 1955  2 Sheets-Sheet 1
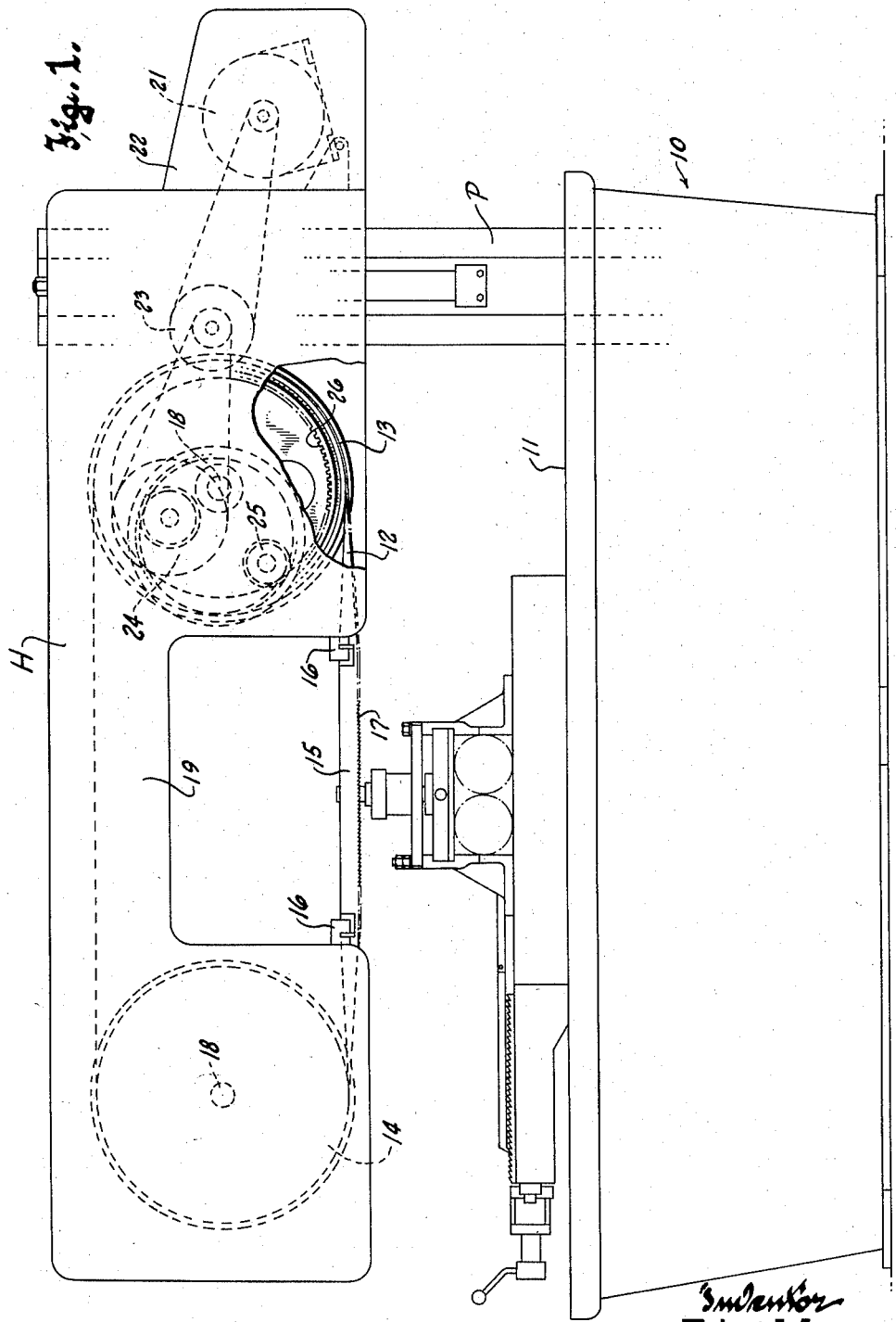

Dec. 23, 1958
R. L. CRANE
2,865,412
DRIVE WHEEL FOR BAND SAWS
Original Filed Sept. 12, 1955
2 Sheets-Sheet 2
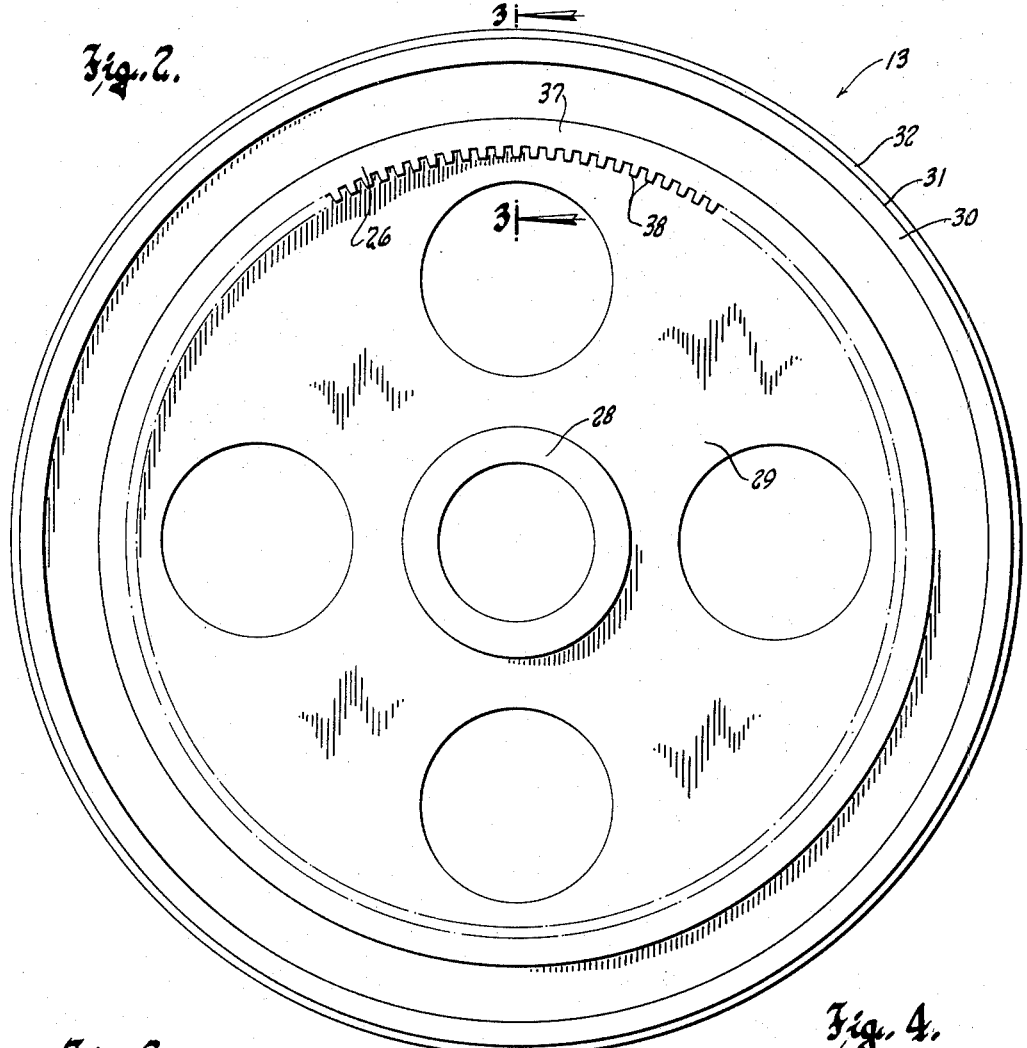
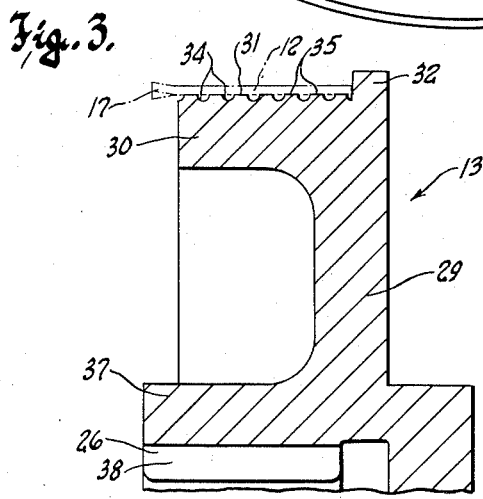
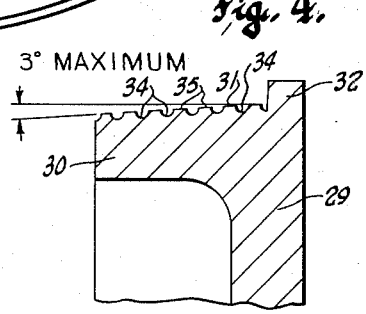

United States Patent Office 2,865,412
Patented Dec. 23, 1958

2,865,412

DRIVE WHEEL FOR BAND SAWS

Robert L. Crane, Hopkins, Minn., assignor to Continental Machines, Inc., Savage, Minn., a corporation of Minnesota Original application September 12, 1955, Serial No. 533,786. Divided and this application March 4, 1957, Serial No. 643,600

2 Claims. (Cl. 143—30)

This invention relates generally to band saws, such, for example, as that disclosed in my copending application, Serial No. 533,786, filed September 12, 1955; and this application is a division of said copending application, relating particularly to the drive wheel or pulley employed in the band saw thereof.

Band saws of the type herein concerned are provided with a saw head assembly including an endless saw band trained about a plurality of pulleys or wheels mounted for rotation on spaced parallel axes. One of the wheels about which the band is trained is power driven and drives the saw band through frictional engagement between one face of the band and the periphery of the wheel.

One of the most vexing problems encountered in present day high speed band saws of the type disclosed in my aforesaid copending application is that slippage between the saw band and its driving wheel makes it difficult to take advantage of the full rated capacity of the saw. Such slippage occurs primarily because of the fact that the cutting stretch of the saw band is practically bathed with cutting lubricant in the cutting zone, and this lubricant is carried onto the face of the drive wheel by the saw band as it travels thereover. Thus there is apt to be a film of cutting lubricant interposed between the mating faces of the saw band and the drive wheel at all times, and an excessively high tension on the band is necessary to maintain it tractively coupled with the drive wheel.

In most cases, however, it is impossible to safely tension the band sufficiently to overcome slippage. This is especially true at such times as the rate of feed of the saw through the work approaches full rated capacity of the saw, due to the fact that the drag upon the saw band, which induces slippage, increases in proportion to the speed at which the saw band is fed into the work.

It is an object of this invention, therefore, to provide a drive wheel for a band sawing machine of the character described wherein slippage between the drive wheel and the saw band trained thereover will be minimized to the point where the machine can be operated at or close to rated capacity without the need for subjecting the saw band to dangerously high degrees of tension.

More specifically, it is an object of this invention to achieve an unusually high degree of traction between the driving wheel and the saw band of a band sawing machine of the character described through the provision of a drive wheel having a face of novel configuration and which greatly reduces the area of engagement between the saw band and the drive wheel.

In this respect, it is a purpose of this invention to provide a drive wheel for a band saw of the character described wherein the area of engagement between the face of the drive wheel and a saw band trained thereover is reduced by as much as 50% from the conventional by the expedient of limiting the band to tractive engagement with a multiplicity of narrow spaced apart lands on the drive wheel, preferably arranged circumferentially thereof. These lands function to force cutting lubricant from the band and into circumferential grooves in the face of the drive wheel defining the lands, to assure the best possible driving engagement between the wheel and the saw band.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is an elevational view of a band type cutoff saw embodying the principles of this invention;

Figure 2 is an elevational view of the drive wheel per se of the saw;

Figure 3 is an enlarged fragmentary sectional view through the rim portion of the drive wheel, taken along the plane of the line 3—3 in Figure 2; and Figure 4 is a fragmentary sectional view similar to Figure 3 but having the taper on the face of the wheel exaggerated for purposes of illustration.

Referring now more particularly to the accompanying drawings in which like reference characters apply to like parts throughout the several views, the numeral 10 generally designates the elongated main base of a band type cutoff saw like that of my copending application, Serial No. 533,786, filed September 12, 1955. A post P rigidly anchored in one end portion of the base and projecting vertically a distance above the top 11 thereof provides both a support and a guiding member for a saw head assembly H, the latter being slidably mounted on the post in cantilever fashion to lengthwise overlie the base 10, and for up and down motion relative to the base.

As brought out in greater detail in the aforesaid copending application, the saw head assembly includes an endless saw band 12, and horizontally spaced drive and idler pulleys or wheels, 13 and 14, respectively, over which the band is trained. The cutting stretch 15 of the band is lowermost and is constrained to travel in a horizontal path through the working zone by guides 16 which hold the band twisted with the flat sides thereof disposed in parallel vertical planes. The saw band has teeth 17 on one edge thereof, and the teeth on the cutting stretch 15 of the band face downwardly toward the base 10.

Each of the wheels 13 and 14 is mounted on a shaft 18 supported in bearings (not shown) carried by the housing 19 of the saw head assembly, with the wheels constrained to rotate on parallel axes which lie in a horizontal plane normal to the post P.

Rotation may be imparted to the drive pulley 13 as by means of an electric motor 21 mounted on an extension 22 at the post end of the housing 19. The motor is drivingly connected with the pulley 13 through a speed changing device 23 and a gear reducer 24, the latter having a drive pinion 25 meshing with an internal ring gear 26 on the drive pulley 13, formed as an integral part thereof.

The drive wheel or pulley 13 is of special construction, and comprises a bored hub 28 and a web 29 fixed to the hub and projecting radially therefrom substantially normal to the hub axis. The wheel is provided with an annular rim 30 projecting axially from one face of the web, and the periphery of the rim provides a face 31 over which the saw band 12 may be trained to be driven by the wheel. The rim 30 also has a circumferential flange 32 projecting radially outwardly therefrom substantially in line with the adjoining portions of the web 29. The flange 32 provides a stop or backup against which the back edge of the saw band abuts to position the band with its toothed edge 17 overhanging the opposite axial end of the rim 30.

It is one of the features of the drive wheel of this invention that the face 31 thereof which is to receive the saw band has a slight uniform taper of not more, and preferably considerably less, than 3°, with the large diameter of the wheel face adjacent to the flange 32. This taper, of course, tends to cause a saw band trained over the face 31 to move toward the flange 32, and thus prevents accidental detachment of the band from the pulley.

It is a further feature of the drive wheel or pulley that the area of the face engaged by the flat side of the saw band is reduced by 50% or more from the conventional, and this is accomplished by forming a multiplicity of axially equi-spaced grooves 34 in the face of the wheel. One of the grooves is located directly at the base of the flange 32, and it cooperates with the remaining grooves to define substantially narrow lands 35 therebetween. These grooves are preferably arranged circumferentially of the pulley face, and the narrow circumferential lands between the grooves and upon which one flat face of the saw band rides as it is driven by the pulley are slightly frusto-conical in cross section, and afford a far better frictional driving connection between the face of the pulley and the saw band than was possible heretofore. The slippage which inevitably resulted in the past due to the presence of cutting lubricant on the saw band is thus largely overcome by the narrow lands on the pulley face.

These lands have the peculiar property of being able to press against the mating face of the saw band with sufficient localized pressure as to force lubricant therefrom into the grooves between the lands. It has been found in practice that when the face of the drive wheel is formed as described, slippage between the band and the grooved face of the wheel is greatly minimized and even prevented, despite the fact that sawing may be taking place at or near maximum rated capacity of the saw.

Actual tests have disclosed that with a minimum of taper on the pulley face, i. e. less than 3°, the tension that must be maintained on the saw band in order to establish a good driving connection between it and the pulley is much less and far more uniform across the width of the band than when the more conventional greater tapers are employed. Moreover, the grooves and the lands therebetween offset any tendency of the band to run off the unflanged end of the pulley face due to the slight taper thereon.

With a high speed cutoff saw such as that shown in Figure 1, a unit pressure of about 285 p. s. i. between the band and pulley face is needed to provide the necessary traction to drive the band at full tooth capacity. This unit pressure is readily achieved despite the high film strength oils used as the coolant and without placing excessive tension upon the band, when the total area of the lands engaged by the band is not more than one-half the area of the wheel face, and the width of each land is not more than one-sixteenth of an inch.

It is well known that as the area of two mating lubricated surfaces increases the lubricant increasingly resists being forced from between the surfaces by forces tending to press the surfaces together. The oil film pressure thus increases in proportion to the area of the mating surfaces.

By limiting the width of the lands 35 to one-sixteenth of an inch, therefore, practically all the oil is expelled from between the contacting surfaces of the lands and the saw band, and the desired 285 p. s. i. unit pressure therebetween can be attained with safe tension upon the band, whereas an excessively high and unsafe tension would have to be maintained on the band if the face of the drive pulley were ungrooved.

Another feature of the drive wheel or pulley 13 resides in the fact that it is provided with an internal ring gear 26, preferably but not necessarily integral therewith. The ring gear 26 is shown provided by an annular flange 37 formed as part of the wheel and projecting axially from the web 29 thereof at a location inside the rim 30 of the wheel but radially spaced from the rim and concentric thereto. The teeth 38 of the ring gear are adapted to mesh with the driving pinion 25 in the manner shown in Figure 1.

From the foregoing description taken together with the accompanying drawings, it will be readily appreciated by those skilled in the art that this invention provides a drive wheel for band saws which has as its outstanding characteristics an antislip face and a ring gear formed integrally with the wheel.

What I claim as my invention is:

1. A drive wheel, for band saws, having a face over which a saw band may be trained, said drive wheel being characterized by: means on the wheel providing a circumferential flange at one axial end of the wheel face; a taper of less than 3° on said face with the largest diameter of the face adjacent to said flange; and a series of small circumferential grooves in the wheel face, equi-spaced from one another along the entire axial dimension of the wheel face, one of said grooves being directly at the base of said flange and the other grooves having a uniform width at the wheel face and having considerably greater width than depth, said grooves cooperating to define lands therebetween of a uniform narrow width substantially equal to the width of said other grooves and aggregating approximately fifty percent of the total wheel face area.

2. The drive wheel of claim 1 further characterized by the fact that each of said lands has a width of approximately 1/16 of an inch.

References Cited in the file of this patent

UNITED STATES PATENTS

| | | |
|---|---|---|
| 1,374,638 | De Cew et al. | Apr. 12, 1921 |
| 1,825,164 | Skillman | Sept. 29, 1931 |
| 2,081,033 | Biro | May 18, 1937 |

FOREIGN PATENTS

| | | |
|---|---|---|
| 9,024 | Switzerland | Sept. 11, 1894 |